Sept. 10, 1935.   A. N. BECKER   2,014,351
VEHICLE HANDLING APPARATUS
Filed Sept. 16, 1929   3 Sheets-Sheet 1
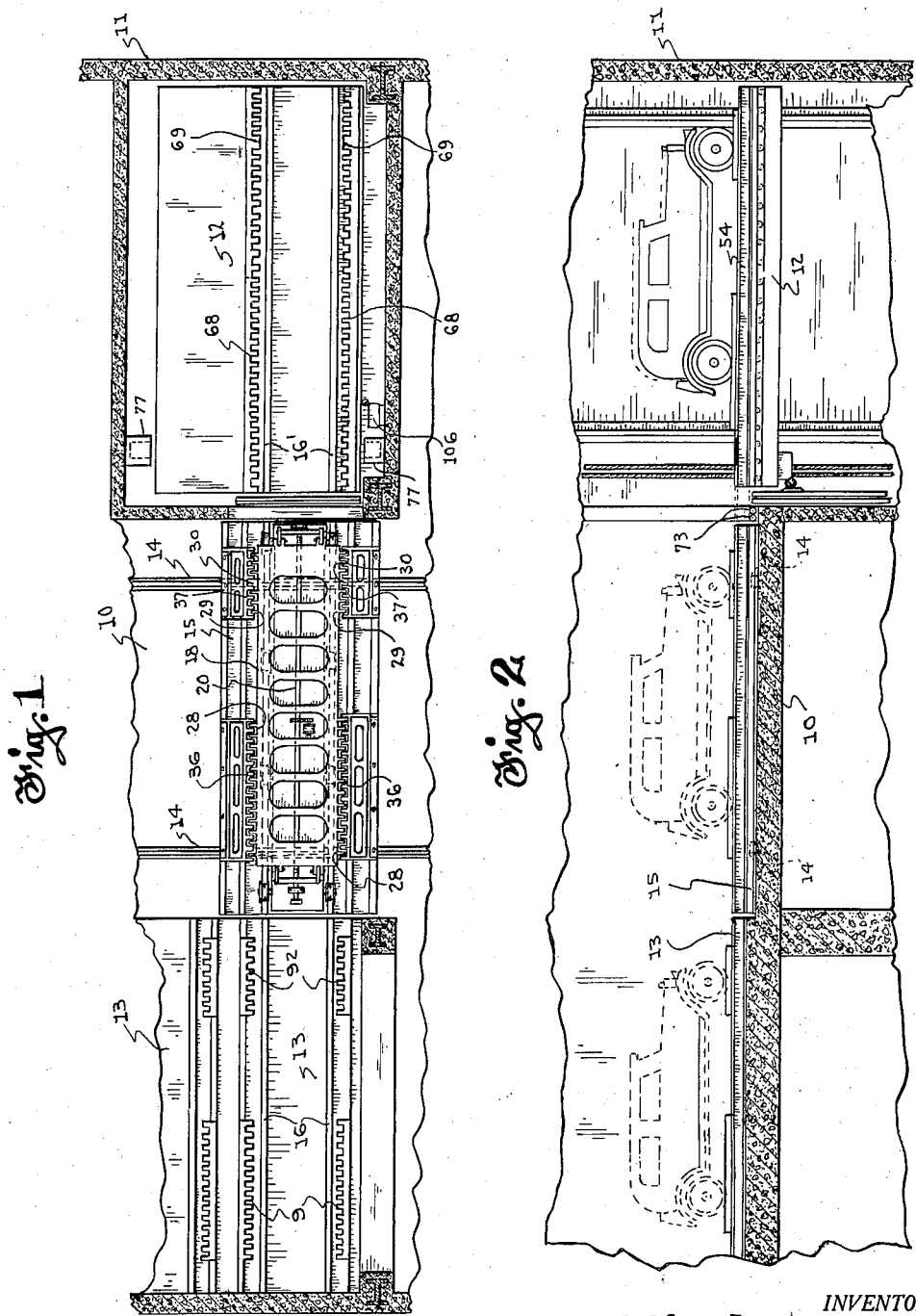
INVENTOR.
Alfonse N. Becker
BY
Morsell, Kuney & Morsell
ATTORNEYS.

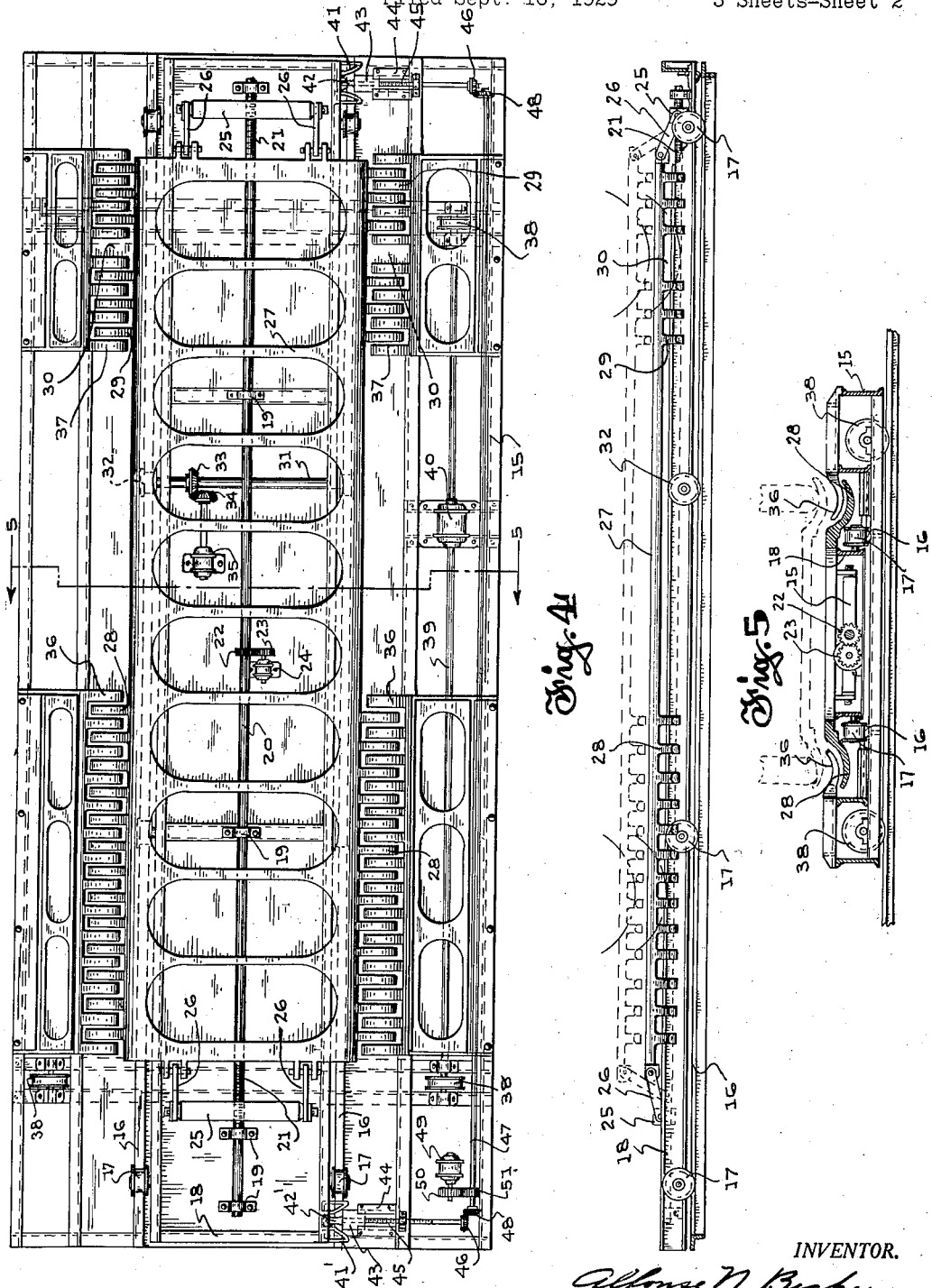

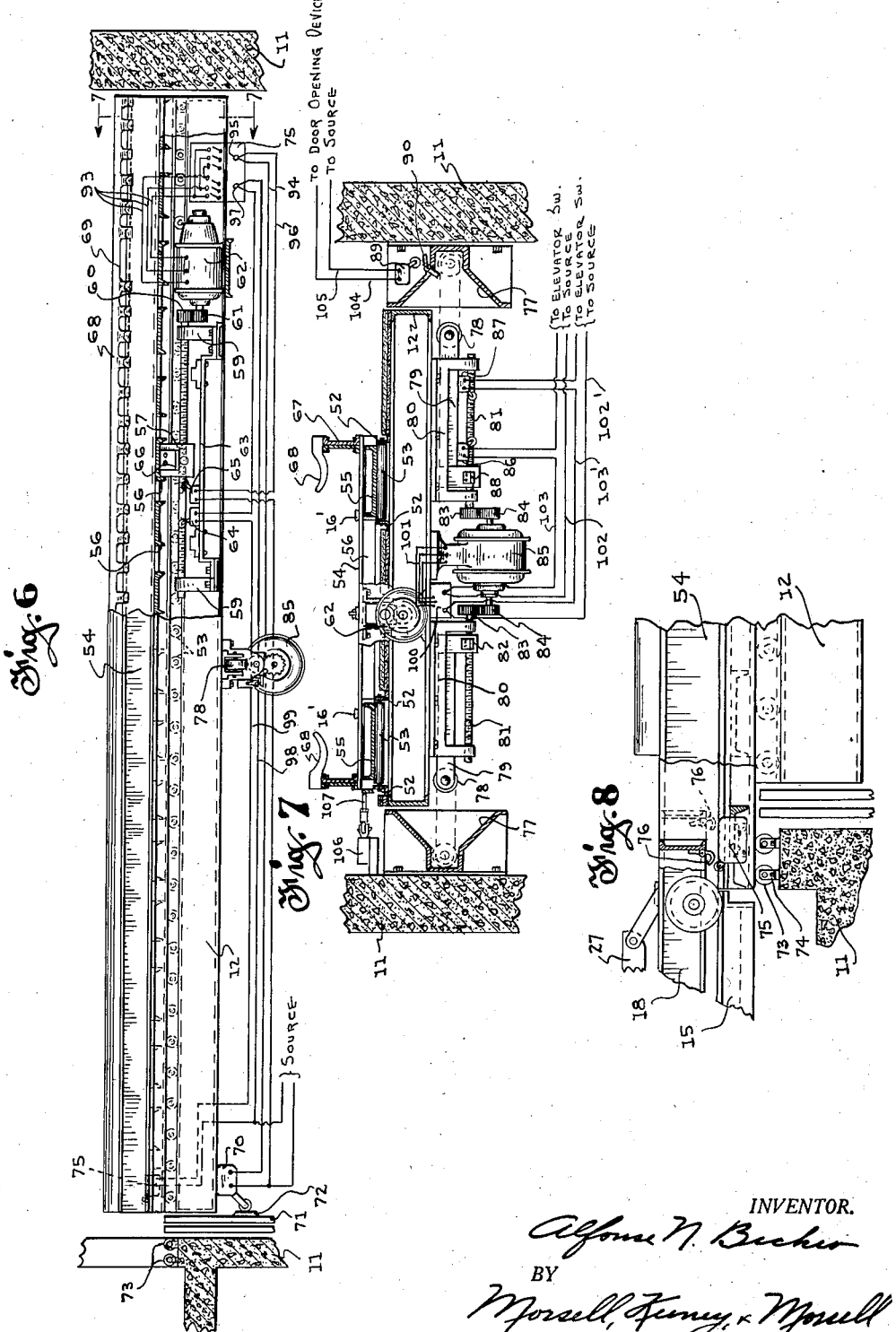

Patented Sept. 10, 1935

2,014,351

UNITED STATES PATENT OFFICE 2,014,351

VEHICLE HANDLING APPARATUS

Alfonse N. Becker, Milwaukee, Wis., assignor, by mesne assignments, to Automatic Parking Systems, Inc., a corporation of Illinois Application September 16, 1929, Serial No. 392,793

35 Claims. (Cl. 214—16.1)

This invention relates to improvements in vehicle handling apparatus.

Heretofore, several types of vehicle storage systems have been designed in which elevators and transfer tables have been employed to move a vehicle to or from a desired stall on a desired floor. In one of these systems gravity is utilized to move the vehicle to and from the carrying units. This system is objectionable as the vehicle is likely to acquire a dangerous momentum when being so used. Other systems have lifting devices which are adapted to engage below the axles. These are open to objection because the axles of the various cars differ in shape and are likely to cause obstruction and because the lifting devices are not adaptable to cars equipped with the proposed front wheel drive. One system employs a wheel engaging device to lift the vehicles but in said system there is a lateral engagement with the wheels by means of wedge members. This system is objectionable as the wedges are injurious to the tires.

It is one of the objects of this invention to overcome the above mentioned objectionable features by providing a vehicle handling apparatus in which a novel form of lifting device is employed which is adapted to move upwardly from below the vehicle tires to engage the latter for the purpose of vertically lifting the vehicle preparatory to its being moved, the said lifting device being capable of readily handling a car of any standard wheelbase.

A further object of this invention is to provide a vehicle handling apparatus in which an elevator platform is provided with a movable superstructure which is adapted to be automatically moved outwardly at a landing, to bridge the gap between the elevator platform and the wall of the hatchway so that the transfer table lifting device may be more easily moved onto the elevator.

A further object of this invention is to provide a means for insuring the proper positioning of the vehicle on all of the carrying units and in the stalls.

A further object of this invention is to provide a vehicle handling apparatus of the type described in which the operation is automatic.

With the above and other objects in view, the invention consists of the improved vehicle handling apparatus, and all its parts and combinations, as set forth in the claims, and all equivalents thereof.

In the accompanying drawings, illustrating one complete embodiment of the preferred form of the invention, in which the same reference numerals designate the same parts in all of the views:

Fig. 1 is a horizontal sectional view taken through a portion of a garage equipped with the improved apparatus;

Fig. 2 is a vertical sectional view showing the same portion of the garage;

Fig. 3 is an enlarged plan view of the transfer table and trolley;

Fig. 4 is a side view of the trolley on its tracks, the dotted lines showing the raised position of the saddle;

Fig. 5 is a sectional view taken on line 5—5 of Fig. 3;

Fig. 6 is a side view of the elevator platform, parts being broken away and parts being shown in section;

Fig. 7 is a sectional view taken on line 7—7 of Fig. 6; and

Fig. 8 is an enlarged detail view showing the elevator superstructure in extended position.

Referring to the drawings, the numeral 10 designates a floor of a multi-floor garage, and the numeral 11 a passageway within which an elevator 12 is vertically movable. Arranged along one side of the floor 10 is a plurality of stalls 13 and parallel to the stalls are tracks 14 along which a transfer table 15 is adapted to move.

Referring more particularly to Figs. 3, 4 and 5 wherein the transfer table is illustrated in detail, it will be seen that said table is provided with tracks 16 for receiving the wheels 17 of a carriage 18. Journaled longitudinally of the carriage in bearings 19 is a shaft 20 having oppositely threaded portions 21. A gear 22, rigidly mounted on the shaft is driven by a gear 23 extending from the shaft of a driving motor 24. The threaded portions 21 of the shaft are threaded through threaded openings of traveling members 25. Links 26 have one end pivotally connected to the traveling members and have their other ends pivoted to a vertically movable saddle 27. Extending from each side of the saddle is a group of concave fingers 28, and another group 29 of less length than the group 28. All of said fingers are equally spaced apart except that in the group 29 one of the central fingers is omitted to provide a recess 30. A driving axle 31 is journaled transversely across the carriage and said axle is provided with rigidly mounted wheels 32 which engage the tracks 16, and with a bevel gear 33. The latter is engaged by a bevel gear 34 on the drive shaft of a motor 35.

Each side of the transfer table 15 is provided with a group of stationary concave fingers 36 and with a shorter group 37. When the saddle 27 of the carriage is elevated, the fingers carried thereby are adapted to move upwardly in the spaces between the stationary fingers 36 and 37.

Two of the wheels 38 of the transfer table are rigidly mounted on a longitudinally extending drive shaft 39 which is adapted to be rotated by a motor 40 to propel the table.

The carriage 18 is provided at each end with V-shaped socket members 41 and 41' which are adapted to be entered by engaging members 42 and 42'. The latter are carried by traveling blocks 43 which are adapted to be moved between guides 44 by screws 45. The end of each screw is provided with a rigidly mounted bevel gear 46. A shaft 47, journaled longitudinally of the transfer table, is provided on each end with rigidly mounted bevel gears 48, which engage the gears 46. A motor 49 has a gear 50 carried by its drive shaft, the latter gear engaging a gear 51 rigidly mounted on the shaft 47 to drive the latter. Thus, upon operation of the motor 49, both of the engaging members 42 are moved in or out of their respective sockets to lock the carriage in a fixed position on the transfer table or to release the carriage.

On the elevator 12, between pairs of angle members 52, are mounted two rows of rollers 53 (see Figs. 6 and 7). An elevator superstructure 54 has extending along each side of the lower portion thereof, inverted channels 55 which engage the rollers 53. Thus the superstructure 54 may be moved back and forth over the rollers on the elevator platform.

Extending transversely below the superstructure and having their ends secured to the longitudinally extending channels 55, are a plurality of channel members 56. Within one of said transverse channels, the upper portion of a traveling member 57 is positioned. Said traveling member has a threaded bore through which a screw 58 extends. The said screw is journaled in bearings 59 carried by the elevator platform. One end of the screw has a rigidly mounted gear 60 which is engaged by a gear 61 mounted on the drive shaft of a motor 62. A support 63 carries normally closed limit switches 64 and 65 which are adapted to be engaged by an extension 66 of the traveling member 57.

Mounted on each side of the elevator platform superstructure on supports 67 are stationary fingers 68, the said fingers extending the entire length of the platform. One or more fingers are omitted on each side as at 69 to form recesses for receiving the front wheels of the vehicle to properly position the latter. Tracks 16" adapted to register with the tracks 16 on the transfer table are also provided on the superstructure.

A normally open limit switch 70 carried adjacent an end of the elevator platform is wired to the electric motor 62 and is adapted to close the circuit to said motor to cause movement of the superstructure 54, when the hatchway doors 71 are opened, the latter carrying a member 72 for tripping the switch 70. Rollers 73 are rotatably mounted in brackets 74, the latter being positioned on the threshold of the elevator door to form a frictionless support for the end of the superstructure (see Fig. 8).

The end of the elevator platform superstructure is provided with a normally open limit switch 75, the said switch being so wired to the electric motor 62, through a reversing switch 75' of the usual construction as to cause reverse operation of said motor for returning the superstructure to its normal position on the elevator platform. A pivoted hook member 76 depending from an end of the carriage 18 is adapted, because of its pivotal mounting, to pass over the switch 75, when the carriage is entering the elevator, without affecting said switch. However, when the carriage is returning from the elevator, the hook 76 will trip the switch 75 to cause return of the superstructure to its normal position (see Fig. 8).

Sockets 77, carried by opposite sides of the elevator shaft, are adapted to be entered by wheels 78 of engaging members 79, to properly level the elevator at a desired floor. The engaging members are slidable in brackets 80 depending from the bottom of the elevator. Screws 81 are journaled in the brackets 80 and extend through threaded bores of traveling members 82, the latter being connected with the inner ends of the engaging members 79. The inner ends of the screws carry rigidly mounted gears 83 which mesh with gears 84 rigidly mounted on the drive shaft of a motor 85. Normally closed limit switches 86 and 87, wired to the motor 85 are adapted to be tripped by a lug 88 projecting from one of the traveling members 82. A switch 89 adjacent one of the sockets 77 is engaged by a bell crank lever 90 and is adapted to be tripped thereby when the wheel 78 is fully within the socket to start mechanism in operation for opening the hatchway doors 71 (not shown).

The stalls or storage compartments 13 are provided with tracks 16" adapted to register with the tracks 16 on the transfer table, and said stalls are also provided with sets of concave wheel supporting fingers 91 and 92 similar to those mounted on the transfer table.

Referring to the wiring arrangement for the device, the reversing switch 75' is connected by wires 93 with the electric motor 62. A wire 94 connects a contact 95 of the reversing switch with the limit switch 70. Another wire 96 extends from the switch 70, through the switch 65, back to the contact 95 of the reversing switch. Another contact 97 on the reversing switch is connected by a wire 98 with the limit switch 75. A return wire 99 extends through the limit switch 64.

A reversing switch 100 is connected by wires 101 with the motor 85. Wires 102 and 102' from said reversing switch extend to a source of current and other wires 103 and 103' extend through the limit switches 86 and 87 respectively to an operating switch on the elevator.

The limit switch 89 has a wire 104 extending therefrom to the motor of a device (not shown) for opening the hatchway doors, and another wire 105 extends to a source of current. A switch 106 extending from the side of the elevator shaft is similarly connected, and said switch is adapted to be tripped by a projecting member 107 of the superstructure when the latter is returning to the elevator to cause closing of the hatchway doors.

The operation of the device is as follows:

When the elevator platform 12, carrying a vehicle, is approaching a desired floor, through a suitable switch, the motor 85 is started in the proper direction to cause movement of the engaging members 79 outwardly. The lug 88 (see Fig. 7) will pass the switch 86 without affecting the latter, but when the wheels 78 are fully within the sockets, the lug 88 will trip the normally closed switch 87 to break the circuit to the motor 85. At the same time, one of the wheels 78 will engage the bell crank lever 90 to cause closing of the normally open switch 89. The latter will start mechanism in operation for opening the hatchway doors 71.

When the doors have been fully opened, the member 72 carried thereby will trip the normally open switch 70 to start the motor 62 in operation. The latter motor, through the screw 58, will cause outward movement of the superstructure 54 to bridge the gap between the end of the elevator platform and the transfer table. When the superstructure has been moved outwardly a desired distance, the lug 66 on the traveling member 57 will trip the normally closed switch 64 to break the circuit to the motor 62. The superstructure will now be positioned as shown in Fig. 8.

Next, the transfer table 15 is propelled to a position adjacent the elevator and the tracks 16 thereon are brought into registration with the tracks 16' on the elevator superstructure. The motor 35 on the carriage 18 is then operated to move said carriage into the elevator. Inasmuch as the elevator superstructure has been moved outwardly, the carriage will travel into the elevator without having to pass over any gap. When the carriage is completely within the elevator, the motor 49 on the transfer table will be automatically operated to cause the engaging member 41 to engage the socket 42' of the carriage. This will so position the carriage that the fingers 28 and 29 will be below the spaces between the fingers 68 of the elevator and will be in a proper position for engaging the vehicle positioned on said fingers in the elevator. Next, the motor 24 of the carriage is started, and the saddle 27 is raised, the fingers 28 and 29 of the carriage passing upwardly through the spaces between the fingers 68 of the elevator, and engaging beneath the wheels of the vehicle to lift the latter. The carriage is then propelled back onto the transfer table, and in so moving, the hook 76 (see Fig. 8) trips the switch 75 to cause reverse operation of the motor 62 for withdrawing the elevator superstructure. When the latter is fully withdrawn, the lug 66 on the traveling member 57 will engage the closed switch 65 to break the circuit to the motor 62. Similarly, the engaging member 107 will trip the normally open switch 106 to cause closing of the hatchway doors 71.

The saddle of the carriage is then lowered to deposit the vehicle on the stationary fingers of the transfer table. Next, the transfer table is propelled to a position opposite a desired stall and the vehicle is raised and moved into the stall by means of the carriage, the latter being properly positioned in the stall by means of the engaging member 42' of the transfer table entering the socket 41 of the carriage. To return a vehicle from a stall to the elevator, the reverse operation is carried out.

It will be noted that the open portions 69 and 30 of the fingers of the elevator and carriage respectively form recesses for receiving the front wheels of the vehicle so that the latter will have a fixed position on all units. It will also be noted that the groups of fingers for the rear wheels are of considerable length so that a car of any standard wheelbase can readily be accommodated.

Although only one form of the invention has been shown and described, it is not desired to be limited to this particular showing, as the broad concept of the invention contemplates all changes and modifications as may fairly come within the scope of the claims. It is further to be understood that the invention may have other adaptations such as use in connection with the moving of goods in a warehouse, or the transfer apparatus may be used without the transfer table and the vehicles may be stored in tiers of bays opposite and adjacent to the elevator shaft.

What I claim is:

1. In a vehicle storage system, an inlet for a vehicle, supporting means for vehicle wheels mounted in said inlet, a carrier adjacent said inlet, a storage compartment adjacent said carrier, elevating means in connection with said carrier, means for moving said carrier underneath a vehicle positioned in said inlet so that said elevating means is positioned directly below the vehicle wheels, and means for causing vertical movement of said elevating means to lift the vehicle wheels off of the supports, said carrier being thereafter movable into said storage compartment, and said elevating means being adapted to lower said vehicle into said storage compartment.

2. In a vehicle storage system, an inlet for a vehicle, supporting means for vehicle wheels mounted in said inlet and comprising a plurality of spaced apart members, a carrier adjacent said inlet, a storage compartment adjacent said carrier, elevating means in connection with said carrier, means for moving said carrier underneath a vehicle positioned in said inlet so that said elevating means is positioned directly below the vehicle wheels, and means for causing vertical movement of said elevating means to lift the vehicle wheels off of the supports, said elevating means being adapted to move within the spaces of the supporting means, said carrier being thereafter movable into said storage compartment, and said elevating means being adapted to lower said vehicle into said storage compartment.

3. In a vehicle storage system, an inlet for a vehicle, supporting means for vehicle wheels mounted in said inlet and comprising a plurality of spaced apart concave members, a carrier adjacent said inlet, a storage compartment adjacent said carrier, elevating means in connection with said carrier, means for moving said carrier underneath a vehicle positioned in said inlet so that said elevating means is positioned directly below the vehicle wheels, and means for causing vertical movement of said elevating means to lift the vehicle wheels off of the supports, said elevating means being adapted to move within the spaces of the supporting means, said carrier being thereafter movable into said storage compartment, and said elevating means being adapted to lower said vehicle into said storage compartment.

4. In a vehicle storage system, an inlet for a vehicle, supporting means for vehicle wheels mounted in said inlet and comprising a plurality of spaced apart members, a carrier adjacent said inlet, a storage compartment adjacent said carrier, elevating means in connection with said carrier comprising a plurality of spaced apart members, means for moving said carrier underneath a vehicle positioned in said inlet so that said elevating means is positioned directly below the vehicle wheels, and means for causing vertical movement of said elevating means to lift the vehicle wheels off of the supports, said elevating means being adapted to move within the spaces of the supporting means, said carrier being thereafter movable into said storage compartment, and said elevating means being adapted to lower said vehicle into said storage compartment.

5. In a vehicle storage system, an inlet for a vehicle, supporting means for vehicle wheels mounted in said inlet, a storage compartment having wheel supporting means therein, a transfer table movable from said inlet to said storage compartment, wheel supporting means carried by said transfer table, a carrier mounted on said transfer table and movable with respect thereto, elevating means in connection with said carrier, means for moving said carrier underneath a vehicle positioned in said inlet so that said elevating means is positioned directly below the vehicle wheels, and means for causing vertical movement of said elevating means to lift the vehicle wheels off of the supports, said carrier being thereafter movable back onto said transfer table, and said elevating means being adapted to lower the vehicle onto the supports thereon, said transfer table being then movable adjacent said storage compartment, and said carrier being adapted to deposit the vehicle on the supports in said compartment.

6. In a vehicle storage system, an inlet for a vehicle, supporting means for vehicle wheels mounted in said inlet and comprising a plurality of spaced apart members, a storage compartment having wheel supporting means therein comprising a plurality of spaced apart members, a transfer table movable from said inlet to said storage compartment, wheel supporting means comprising a plurality of spaced apart members carried by said transfer table, a carrier mounted on said transfer table and movable with respect thereto, elevating means comprising a plurality of spaced apart members in connection with said carrier, means for moving said carrier underneath a vehicle positioned in said inlet so that said elevating means is positioned directly below the vehicle wheels, and means for causing vertical movement of said elevating means to lift the vehicle wheels off of the supports, said elevating means being adapted to move within the spaces of the supporting means, and said carrier being thereafter movable back onto said transfer table, and said elevating means being adapted to lower the vehicle onto the supports thereon, said transfer table being then movable adjacent said storage compartment, and said carrier being adapted to deposit the vehicle on the supports in said compartment.

7. In a vehicle storage system, an inlet for a vehicle, supporting means for vehicle wheels mounted in said inlet and comprising a plurality of spaced apart concave members, a storage compartment having wheel supporting means therein comprising a plurality of spaced apart concave members, a transfer table movable from said inlet to said storage compartment, wheel supporting means comprising a plurality of spaced apart concave members carried by said transfer table, a carrier mounted on said transfer table and movable with respect thereto, elevating means comprising a plurality of spaced apart concave members in connection with said carrier, means for moving said carrier underneath a vehicle positioned in said inlet so that said elevating means is positioned directly below the vehicle wheels, and means for causing vertical movement of said elevating means to lift the vehicle wheels off of the supports, said elevating means being adapted to move within the spaces of the supporting means, and said carrier being thereafter movable back onto said transfer table, and said elevating means being adapted to lower the vehicle onto the supports thereon, said transfer table being then movable adjacent said storage compartment, and said carrier being adapted to deposit the vehicle on the supports in said compartment.

8. In a storage building having a plurality of superimposed floors, an elevator for lifting an object to a desired floor, said elevator having a platform provided with rollers, a transfer table on said floor movable adjacent said elevator, a carrier mounted on said transfer table and movable into said elevator to remove the object therefrom, and a platform superstructure on which the object is adapted to be positioned mounted on the rollers of the elevator platform, said superstructure being movable adjacent the end of said transfer table to facilitate movement of the carrier into the elevator.

9. In a storage building having a plurality of superimposed floors, an elevator for lifting an object to a desired floor, said elevator having a platform provided with a movable superstructure on which the object is adapted to be positioned, a transfer table on said floor movable adjacent said elevator, a carrier mounted on said transfer table and movable into said elevator to remove the object therefrom, electric motor operated means for moving said superstructure adjacent the end of said transfer table to facilitate movement of the carrier into the elevator, and means for automatically starting said electric motor operated means when the elevator is adjacent a floor.

10. In a storage building having a plurality of superimposed floors, an elevator for lifting an object to a desired floor, said elevator having a platform provided with a movable superstructure on which the object is adapted to be positioned, a transfer table on said floor movable adjacent said elevator, a carrier mounted on said transfer table and movable into said elevator to remove the object therefrom, electric motor operated means for moving said superstructure adjacent the end of said transfer table to facilitate movement of the carrier into the elevator, means for automatically starting said electric motor operated means when the elevator is adjacent a floor, and means for automatically stopping said electric motor operated means when the superstructure is adjacent the end of the transfer table.

11. In a storage building having a plurality of superimposed floors, an elevator hatchway having doors adjacent each floor, an elevator movable in said hatchway for lifting an object to a desired floor, said elevator having a platform provided with a movable superstructure on which the object is adapted to be positioned, a transfer table on said floor movable adjacent said elevator, a carrier mounted on said transfer table and movable into said elevator to remove the object therefrom, electric motor operated means for moving said superstructure adjacent the end of said transfer table to facilitate movement of the carrier into the elevator, and means operable by opening of the hatchway doors for starting said electric motor operated means.

12. In a storage building having a plurality of superimposed floors, an elevator hatchway having doors adjacent each floor, an elevator movable in said hatchway for lifting an object to a desired floor, said elevator having a platform provided with a movable superstructure on which the object is adapted to be positioned, a transfer table on said floor movable adjacent said elevator, a carrier mounted on said transfer table and movable into said elevator to remove the object therefrom, electric motor operated means for moving said superstructure adjacent the end of said transfer table to facilitate movement of the carrier into the elevator, means operable by opening of the hatchway doors for starting said electric motor operated means, and means operable by the carrier when the latter has returned to the transfer table for starting the electric motor operated means in a reverse direction to return the superstructure to its original position.

13. In a storage building having a plurality of superimposed floors, an elevator hatchway having doors adjacent each floor, an elevator movable in said hatchway for lifting an object to a desired floor, said elevator having a platform provided with a movable superstructure on which the object is adapted to be positioned, a transfer table on said floor movable adjacent said elevator, a carrier mounted on said transfer table and movable into said elevator to remove the object therefrom, electric motor operated means for moving said superstructure adjacent the end of said transfer table to facilitate movement of the carrier into the elevator, means operable by opening of the hatchway doors for starting said electric motor operated means, means for automatically stopping said electric motor operated means when the superstructure is adjacent the end of the transfer table, means operable by the carrier when the latter has returned to the transfer table for starting the electric motor operated means in a reverse direction to return the superstructure to its original position, and means for automatically stopping said electric motor operated means when the superstructure has fully returned.

14. In a vehicle storage system, a plurality of vehicle receiving portions, supporting means for vehicle wheels mounted in each of said portions, a carrier, elevating means in connection with said carrier, means for moving said carrier underneath a vehicle positioned in one of said receiving portions so that said elevating means is positioned directly below the supported vehicle wheels, and means for causing vertical movement of said elevating means to lift the said vehicle wheels off their supports, said carrier being thereafter movable with said vehicle into another receiving portion, and said elevating means being adapted to lower the said wheels onto the supports in said other receiving portion.

15. In a vehicle storage system, a plurality of vehicle receiving portions, supporting means for vehicle wheels mounted in each of said portions and comprising a plurality of spaced apart members, a carrier, elevating means in connection with said carrier, means for moving said carrier underneath a vehicle positioned in one of said receiving portions so that said elevating means is positioned directly below the supported vehicle wheels, and means for causing vertical movement of said elevating means to lift the said vehicle wheels off of their supports, said elevating means being adapted to move within the spaces of the supporting means, said carrier being thereafter movable with the vehicle into another receiving portion, and said elevating means being adapted to lower the said wheels onto the supports in said other receiving portion.

16. In a vehicle storage system, a plurality of vehicle receiving portions, supporting means for vehicle wheels mounted in each of said portions and comprising a plurality of spaced apart concave members, a carrier, elevating means in connection with said carrier, means for moving said carrier underneath a vehicle positioned in one of said receiving portions so that said elevating means is positioned directly below the supported vehicle wheels, and means for causing vertical movement of said elevating means to lift the said vehicle wheels off of their supports, said elevating means being adapted to move within the spaces of the supporting means, said carrier being thereafter movable with the vehicle into another receiving portion, and said elevating means being adapted to lower the said wheels onto the supports in said other receiving portion.

17. In a vehicle storage system, a plurality of vehicle receiving portions, supporting means for vehicle wheels mounted in each of said portions and comprising a plurality of spaced apart members, a carrier, elevating means in connection with said carrier comprising a plurality of spaced apart members, means for moving said carrier underneath a vehicle positioned in one of said receiving portions so that said elevating means is positioned directly below the supported vehicle wheels, and means for causing vertical movement of said elevating means to lift the said supported vehicle wheels off of the supports, said elevating means being adapted to move within the spaces of the supporting means, said carrier being thereafter movable with the vehicle into another receiving portion, and said elevating means being adapted to lower said wheels onto the supports in said other receiving portion.

18. A motor-vehicle transfer truck comprising a movable structure, power-actuated means on said structure including a plurality of wheel-lifting members movable vertically and adapted to engage and lift a plurality of the motor-vehicle wheels off their support, each wheel-lifting member including a pair of spaced elements adapted to be passed under a wheel of the motor-vehicle, mechanism on said structure for operating said wheel-lifting means, a driving mechanism for propelling said structure, and power means on said structure for actuating said wheel-lifting mechanism and said driving mechanism, said truck being adapted to be bodily passed under a motor-vehicle in a direction parallel to the longitudinal axis of the motor-vehicle and said truck being movable with the motor-vehicle with the elevated vehicle wheels supported thereon.

19. A motor-vehicle transfer truck comprising a movable structure, power-actuated means on said structure including a plurality of wheel-lifting members movable angularly to the longitudinal axis of the motor-vehicle and adapted to engage and lift a plurality of the motor-vehicle wheels off their support, each wheel-lifting member including a pair of spaced elements adapted to be passed under a wheel of the motor-vehicle, mechanism for operating said wheel-lifting means, a driving mechanism for propelling said structure, and power means for actuating said wheel-lifting mechanism and said driving mechanism, said truck being passable in its entirety under a motor-vehicle in a direction parallel to the longitudinal axis of the motor-vehicle and said truck being movable with the motor-vehicle with the elevated vehicle wheels supported thereon.

20. A motor-vehicle transfer truck comprising a movable structure, means on said structure including a plurality of wheel-lifting members movable vertically by power and relatively to said structure and adapted to engage and lift a plurality of the motor-vehicle wheels off their support, each wheel-lifting member including a pair of spaced elements adapted to be passed under a wheel of the motor-vehicle, mechanism for operating said wheel-lifting means, a driving mechanism for propelling said structure, and power means for actuating said wheel-lifting mechanism and said driving mechanism, said truck being passable in its entirety under a motor-vehicle in a direction parallel to the longitudinal axis of the motor-vehicle and said truck being movable with the motor-vehicle with the elevated vehicle wheels supported thereon.

21. A motor-vehicle transfer truck comprising a movable structure, means on said structure including a plurality of pairs of spaced members movable vertically by power and relatively to said structure and adapted to engage and lift a plurality of the motor-vehicle wheels off their support, mechanism on said structure for operating said wheel-lifting means, a driving mechanism for propelling said structure, and power means on said structure for actuating said wheel-lifting mechanism and said driving mechanism, said truck being passable under a motor-vehicle in a direction parallel to the longitudinal axis of the motor-vehicle and said truck being movable with the motor-vehicle with the elevated vehicle wheels supported thereon.

22. The combination with supports for a plurality of wheels of a motor-vehicle, said supports having an opening therein, of a motor-vehicle transfer truck comprising a movable structure, means on said structure adapted to move vertically and directly under a pair of the motor-vehicle wheels through said opening in said support and to lift said wheels off their support, mechanism on said structure for operating said wheel-lifting means, a driving mechanism for propelling said structure, and power means on said structure for actuating said wheel-lifting mechanism and said driving mechanism, said truck being movable under a motor-vehicle in a direction parallel to the longitudinal axis of the motor-vehicle, and being movable with the motor-vehicle with the elevated vehicle wheels supported thereon.

23. The combination with supports for a plurality of wheels of a motor-vehicle, said supports having an opening therein, of a motor-vehicle transfer truck comprising a movable structure, means on said structure adapted to move vertically and directly under a pair of the motor-vehicle wheels through said opening in said support and to lift said wheels off their support, mechanism for operating said wheel-lifting means, a driving mechanism for propelling said structure, and power means for actuating said wheel-lifting mechanism and said driving mechanism, said truck being movable under a motor-vehicle in a direction parallel to the longitudinal axis of the motor-vehicle, and being movable with the motor-vehicle with the elevated vehicle wheels supported thereon.

24. In a vehicle storage system, a plurality of vehicle receiving portions, supporting means for vehicle wheels mounted in each of said portions, a carrier, elevating means in connection with said carrier, means for moving said carrier underneath a vehicle positioned in one of said receiving portions so that said elevating means is positioned directly below the supported vehicle wheels, and means for causing vertical movement of said elevating means to lift the said vehicle wheels off their supports, said carrier being thereafter movable with said vehicle into another receiving portion, and said elevating means being adapted to lower the said wheels onto the supports in said other receiving portion.

25. A vehicle handling truck comprising a movable frame, means for propelling said frame, vertically-movable power-driven wheel-lifting means on said frame including a plurality of coacting wheel-lifting elements, each of said elements being adapted to lift a single vehicle wheel, said wheel-lifting means being adapted to be moved vertically under a plurality of the wheels of the vehicle to thereby lift said wheels and thereafter move the vehicle with said frame, and power means for actuating said frame propelling means and said wheel-lifting means.

26. In combination with a truck adapted to be positioned under a vehicle, two pairs of lifting elements carried by said truck, each pair of elements being adapted to engage one wheel of said vehicle, and means for moving said lifting elements to thereby elevate said wheels.

27. In combination with a truck adapted to be positioned under a vehicle, a pair of lifting elements carried by said truck and adapted to engage the periphery of a wheel of said vehicle, and means for moving said lifting elements to elevate said wheel.

28. In combination with a truck adapted to be positioned under a vehicle, two pairs of lifting elements carried by said truck, each pair of elements being adapted to engage one wheel of said vehicle, and means for moving said lifting elements vertically to thereby elevate said wheels.

29. The combination with supporting means for a plurality of wheels of a motor-vehicle, of a motor-vehicle transfer truck adapted to be moved under the motor-vehicle in a direction parallel to the longitudinal axis of the motor-vehicle, means on said truck adapted to move vertically from beneath said supporting means and under a plurality of the motor-vehicle wheels to lift said wheels off their support, and power-driven means on said truck for actuating said wheel-lifting means and for propelling said truck, said truck being movable with the elevated vehicle wheels supported thereon.

30. The combination with supporting means for the wheels of a vehicle, of vehicle transfer means including a plurality of vehicle wheel-lifting elements arranged to be moved vertically from beneath said supporting means and under a plurality of the vehicle wheels to thereby lift the vehicle wheels off said supporting means, and means for propelling said transfer means to move the vehicle from one place to another.

31. The combination with supporting means for the wheels of a vehicle, of vehicle transfer means including a plurality of vehicle wheel-lifting elements arranged to be moved vertically from beneath said supporting means and under a plurality of the vehicle wheels to thereby lift the vehicle wheels off said supporting means, and means for propelling said transfer means to move the vehicle from one place to another, said elements being normally movable under said supporting means in a horizontal direction during the movement of said transfer means when said transfer means is disengaged from the vehicle.

32. Vehicle transferring apparatus including a support movable under the vehicle, a plurality of vehicle wheel-lifting elements mounted on said support, each of said elements being adapted to engage and lift one wheel of the vehicle, means for moving said elements vertically to thereby elevate said wheels, and means for thereafter moving said support to move the vehicle.

33. Vehicle transferring apparatus as embodied in claim 32, and including each of said wheel-lifting elements comprising a pair of spaced members arranged for simultaneous vertical movement.

34. In combination with a support for a vehicle, said support having a plurality of spaced openings therein, means movable under the vehicle, two pairs of lifting elements carried by said means, each pair of said elements comprising a pair of spaced members adapted to be moved through openings in said support to engage and lift one wheel of said vehicle, and means for moving said lifting elements to thereby elevate said wheels.

35. In combination with a support for a vehicle, said support having a plurality of spaced openings therein, means movable under the vehicle, two pairs of lifting elements carried by said means, each pair of said elements comprising a pair of spaced members adapted to be moved through openings in said support to engage and lift one wheel of said vehicle, means for moving said lifting elements to thereby elevate said wheels, said means movable under the vehicle being thereafter movable with the vehicle to move said vehicle to another location and said means for moving said lifting elements being thereafter movable to lower the elevated vehicle wheels.

ALFONSE N. BECKER.